United States Patent
Okamoto et al.

(10) Patent No.: US 6,861,486 B2
(45) Date of Patent: Mar. 1, 2005

(54) CATALYST FOR BULK POLYMERIZATION

(75) Inventors: Syuji Okamoto, Sayama (JP); Hiroshi Ueno, Sayama (JP)

(73) Assignee: Soken Chemical & Engineering Co., Ltd., Tokyo (JP)

(*) Notice: Subject to any disclaimer, the term of this patent is extended or adjusted under 35 U.S.C. 154(b) by 19 days.

(21) Appl. No.: 10/255,744

(22) Filed: Sep. 26, 2002

(65) Prior Publication Data

US 2003/0023012 A1 Jan. 30, 2003

Related U.S. Application Data

(62) Division of application No. 09/540,571, filed on Mar. 31, 2000, now Pat. No. 6,489,412.

(30) Foreign Application Priority Data

Mar. 31, 1999 (JP) ............................................. 11/93461

(51) Int. Cl.$^7$ .................................................. C08F 4/06
(52) U.S. Cl. ....................... 526/126; 526/146; 526/152; 526/317.1; 526/319; 526/335; 526/341
(58) Field of Search ................................ 526/126, 146, 526/152, 317.1, 319, 335, 341

(56) References Cited

U.S. PATENT DOCUMENTS 3,960,824 A   6/1976   Hicks

FOREIGN PATENT DOCUMENTS

| JP | 6-25358 A | 2/1994 | |
| JP | 9-5996 A | 1/1997 | |
| JP | 09005996 A * | 1/1997 | ........... G03F/7/029 |

* cited by examiner

Primary Examiner—William K. Cheung
(74) Attorney, Agent, or Firm—Webb Ziesenheim Logsdon Orkin & Hanson, P.C.

(57) ABSTRACT

A catalyst for bulk polymerization comprising an organometallic compound represented by specified formula and a thiol is provided. The specified organometallic compound is a metallocene compound such as titanocene or zirconocene. The use of this bulk polymerization catalyst comprising a metallocene compound and a thiol enables stable bulk polymerization of a polymerizable unsaturated compound such as an acrylic monomer, the reaction control of which has been difficult in the bulk polymerization of the prior art.

2 Claims, No Drawings

CATALYST FOR BULK POLYMERIZATION

CROSS-REFERENCE TO RELATED APPLICATION

This application is a divisional of U.S. patent application Ser. No. 09/540,571 filed Mar. 31, 2000 now Pat. No. 6,489,412.

FIELD OF THE INVENTION

The present invention relates to a novel catalyst for bulk polymerization and a polymerization method using the bulk polymerization catalyst.

BACKGROUND OF THE INVENTION

Polymerizable compounds having polymerizable double bonds such as acrylic acid, methacrylic acid, styrene and derivatives thereof can be polymerized, in the presence of an initiator of a radical polymerization, by the conventional emulsion polymerization process, suspension polymerization process, solution polymerization process or bulk polymerization process. The thus obtained polymers find application in various uses such as moldings, pressure sensitive adhesives, paints and fibers. Of these polymers, polymers produced by the emulsion polymerization process, suspension polymerization process and solution polymerization process have advantages in that, because the polymerization is carried out in a reaction solvent or dispersion medium, the polymerization temperature can be easily controlled, and the reaction solution has fluidity even if the rate of polymerization is high.

However, the polymers produced by the emulsion polymerization process, suspension polymerization process and solution polymerization process, according to uses, must be subjected to operations such as precipitation, filtration, washing and drying for separating the produced polymer from the reaction solvent or dispersion medium. This causes the process to be laborious and time-consuming.

By contrast, the bulk polymerization process is a process in which the polymerization is carried out in the absence of a solvent or a dispersion medium. Therefore, in the bulk polymerization process, it is not needed to add an organic solvent, a dispersant, an emulsifier and the like. The reaction system of the bulk polymerization can be simple because no impurities such as an organic solvent which participates in the polymerization are contained therein, and the obtained polymer is free from the contaminating of an emulsifier, a dispersant and other impurities therein. Furthermore, it is not needed to remove a solvent or dispersion medium for the purpose of obtaining the desired polymer. From these viewpoints, the bulk polymerization process is an industrially advantageous process.

However, the velocity of polymerization reaction is generally extremely high in the bulk polymerization process, and practically it is extremely difficult to control the bulk polymerization process. In polymers formed at high temperatures with the failure to control the polymerization velocity, it is likely that molecular terminals become unstable due to disproportionation termination, that the molecular weight is lowered, and that branching or gelation of the polymer occurs by, for example, hydrogen abstraction from the previously formed polymer. Therefore, it becomes difficult to implement not only a molecular design regarding the molecular weight, molecular weight distribution, etc. of polymer but also a definite design of molecular structure because of the polymer branching and formation of disproportionation termination terminals. Furthermore, in polymers formed at high temperatures with the failure to control the polymerization velocity, gels may be formed rapidly in a large amount, so that, in the worst case, there is even the danger of explosion attributed to runaway reaction.

Nevertheless, the velocity of polymerization of, for example, styrene and methyl methacrylate is relatively low, so that, even in the bulk polymerization, the reaction control thereof can be managed. Thus, the controlling method has been investigated for long. In the bulk polymerization of styrene, methyl methacrylate or the like, mercaptans may be used for controlling the molecular weight and molecular weight distribution thereof.

However, in the bulk polymerization reaction using mercaptans, it is often difficult to effect a homogeneous reaction control and the types of monomers subjected to the bulk polymerization are limited.

Apart from the above, in the polymerization reaction, the catalyst is varied depending on the type of employed monomer. For example, metallocene compounds such as titanocene are used as the catalyst for polymerization of ethylene or the like. However, the use of metallocene compounds as the catalyst for polymerization of monomers other than α-olefins is little known except for the use thereof together with a sensitizer in photopolymerization. Japanese Patent Laid-open Publication No. 9(1997)-5996 discloses an invention of photopolymerizable composition containing a compound having at least one ethylenically unsaturated double bond capable of addition polymerization, a titanocene compound as a photopolymerization initiator, a sensitizer capable of sensitizing the titanocene compound, the photopolymerization composition further containing a heterocyclic thiol compound. In the invention disclosed in the publication, the titanocene compound is used as a photopolymerization catalyst, and, in the publication, there is no description regarding the use of titanocene compounds as a catalyst for bulk polymerization. Further, the heterocyclic thiol compound described in the publication is a visible radiation sensitizer.

Generally, in the reaction used in metallocene compounds such as titanocene compounds as a catalyst, a sulfurous or sulfuric compound is a compound which lowers the catalytic activity of metallocene compounds. The above-mentioned use of a sulfurous or sulfuric compound as a compound capable of exerting specified function and effect like the above visible radiation sensitizer signifies a highly exceptional usage in metallocene compounds employed as a catalyst. That is, generally, a sulfurous or sulfuric compound is a catalyst poison to metallocene compounds used as a catalyst. Therefore, the addition of a sulfurous or sulfuric compound to a reaction system containing a metallocene compound as a catalyst constitutes a regularly inconceivable combination.

OBJECT OF THE INVENTION

It is an object of the present invention to provide a novel catalyst for use in bulk polymerization. It is a particular object of the present invention to provide a novel catalyst capable of performing a bulk polymerization of a monomer having a polymerizable unsaturated bond, such as an acrylic monomer, without runaway of reaction.

It is another object of the present invention to provide a novel method of bulk polymerization in which use is made of the above novel catalyst.

SUMMARY OF THE INVENTION

The catalyst for bulk polymerization according to the present invention comprises an organometallic compound, which is represented by the formula (I), and a thiol:

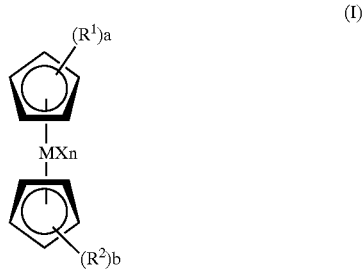

wherein M represents a metal selected from the group consisting of metals of Groups 4A, 4B, 5A and 5B of the periodic table, chromium, ruthenium and palladium; each of $R^1$ and $R^2$ independently represents at least one group selected from the group consisting of an unsubstituted or substituted aliphatic hydrocarbon group, an unsubstituted or substituted alicyclic hydrocarbon group, an unsubstituted or substituted aromatic hydrocarbon group and an unsubstituted or substituted silicon containing group, a hydrogen atom or a single bond, provided that $R^1$ and $R^2$ may cooperate with each other to bond the two 5-membered rings shown in the formula and provided that neighboring groups of $R^1$ or $R^2$ may cooperate with each other to form a cyclic structure;

each of a and b independently is an integer of 1 to 4; X represents a halogen atom or a hydrocarbon group optionally having at least one hydrogen atom thereof substituted with a halogen atom; and n is 0 or an integer substracting 2 from valence of metal M.

The polymerization method of the present invention comprises conducting a bulk polymerization of a monomer having a polymerizable unsaturated bond in the presence of the above catalyst for bulk polymerization comprising an organometallic compound represented by the above formula (I) and a thiol.

The inventors have conducted investigations into the bulk polymerization of acrylic monomers. As a result, it has been found that a catalyst comprising a combination of a metallocene compound and a thiol exerts a surprisingly high catalytic activity in the bulk polymerization of acrylic monomers, which has been difficult in the prior art. The present invention has been completed on the basis of this finding.

The use of the bulk polymerization catalyst comprising an organometallic compound represented by the above formula (I) and a thiol according to the present invention enables conducting a stable bulk polymerization of a monomer having a polymerizable unsaturated bond, such as an acrylic monomer.

DETAILED DESCRIPTION OF THE INVENTION

The bulk polymerization catalyst of the present invention and polymerization method in which use is made of this bulk polymerization catalyst will be described in detail below.

The catalyst of the present invention can subject a compound having a polymerizable unsaturated bond to conduct a stable bulk polymerization.

The organometallic compound for use in the bulk polymerization catalyst of the present invention is represented by the formula (I):

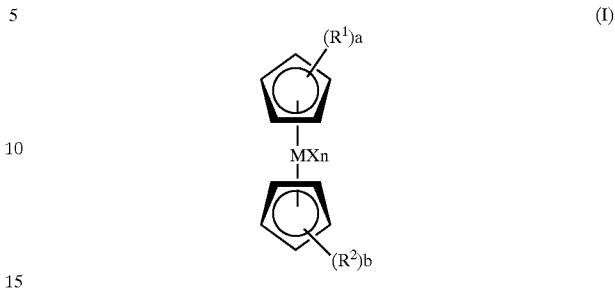

In the formula (I), M represents a metal selected from the group consisting of metals of Groups 4A, 4B, 5A and 5B of the periodic table, chromium, ruthenium and palladium. The metal M is, for example, titanium, zirconium, chromium, ruthenium, vanadium, palladium or tin.

In the formula (I), each of $R^1$ and $R^2$ independently represents at least one group selected from the group consisting of:

an unsubstituted or substituted aliphatic hydrocarbon group, an unsubstituted or substituted alicyclic hydrocarbon group, an unsubstituted or substituted aromatic hydrocarbon group, and an unsubstituted or substituted silicon containing group, or a hydrogen atom or a single bond.

Provided, however, that $R^1$ and $R^2$ may cooperate with each other to bond the two 5-membered rings shown in the formula and that neighboring groups of $R^1$ or $R^2$ may cooperate with each other to form a cyclic structure.

Further, in the formula (I), each of a and b independently is an integer of 1 to 4.

X represents a halogen atom such as chlorine, bromine or iodine, or a hydrocarbon group optionally having at least one hydrogen atom thereof substituted with a halogen atom.

n is 0 or an integer subtracting 2 from valence of metal M.

Examples of the above organometallic compounds include:

titanocene compounds such as dichloro(dicyclopentadienyl)titanium, bisphenyl(dicyclopentadienyl)titanium, bis-2,3,4,5,6-pentafluorophen-1-yl(dicyclopentadienyl)titanium, bis-2,3,5,6-tetrafluorophen-1-yl(dicyclopentadienyl)titanium, bis-2,5,6-trifluorophen-1-yl(dicyclopentadienyl)titanium, bis-2,6-difluorophen-1-yl(dicyclopentadienyl)titanium, bis-2,4-difluorophen-1-yl(dicyclopentadienyl)titanium, bis-2,3,4,5,6-pentafluorophen-1-yl(dimethylcyclopentadienyl)titanium, bis-2,3,5,6-tetrafluorophen-1-yl(dimethylcyclopentadienyl)titanium, bis-2,6-difluorophen-1-yl(dimethylcyclopentadienyl)titanium and bis-2,6-difluoro-3-(pyr-1-yl)phen-1-yl(dimethylcyclopentadienyl)titanium;

zirconocene compounds such as dichloro(dicyclopentadienyl)zirconium, bisphenyl(dicyclopentadienyl)zirconium, bis-2,3,4,5,6-pentafluorophen-1-yl(dicyclopentadienyl)zirconium, bis-2,3,5,6-tetrafluorophen-1-yl(dicyclopentadienyl)zirconium, bis-2,5,6-trifluorophen-1-yl(dicyclopentadienyl)zirconium, bis-2,6-difluorophen-1-yl(dicyclopentadienyl)zirconium, bis-2,4-difluorophen-1-yl(dicyclopentadienyl)zirconium, bis-2,3,4,5,6-pentafluorophen-1-yl(dimethylcyclopentadienyl)zirconium, bis-2,3,5,6-tetrafluorophen-1-yl(dimethylcyclopentadienyl)zirconium, bis-2,6-difluorophen-1-yl(dimethylcyclopentadienyl) zirconium and bis-2,6-difluoro-3-(pyr-1-yl)phen-1-yl (dimethylcyclopentadienyl)zirconium;

chloro(dicyclopentadienyl)vanadium, chloro (bismethylcyclopentadienyl)vanadium, chloro (bispentamethylcyclopentadienyl)vanadium, chloro (dicyclopentadienyl)ruthenium and chloro (dicyclopentadienyl)chromium. These organometallic compounds can be used either individually or in combination.

These organometallic compounds can be used in a regularly employed catalyst amount. These organometallic compounds are generally used in an amount of, for example, 1 to 0.001 part by weight, preferably 0.01 to 0.005 part by weight, per 100 parts by weight of polymerizable unsaturated compound to be polymerized.

Examples of the thiols for use in the present invention include:

alkylthiols having no functional group other than a thiol group, such as ethylmercaptan, butylmercaptan, hexylmercaptan, tert-dodecylmercaptan, n-dodecylmercaptan and octylmercaptan, aromatic thiols having no functional group other than a thiol group, such as phenylmercaptan and benzylmercaptan, thiols having a functional group other than a thiol group, such as β-mercaptopropionic acid, mercaptoethanol, 3-mercaptopropyl(trimethoxy)silane and thiophenol, polyfunctional thiol compounds obtained by esterifying trithioglycerol or pentaerythritol with β-mercaptopropionic acid, and polymeric thiols having an active thiol group, such as polysulfide polymers.

The addition amount (use amount) of the above thiols can appropriately be determined taking the properties of polymer intended to obtain into account. That is, when the thiol concentration in a reaction system is increased, not only the conversion of monomers per time but also the final (reached) conversion (ratio of polymer converted from monomer to monomer) becomes high. On the other hand, the increase of the organometallic compound leads to an increase of the conversion per time but does not exert any marked influence on the final conversion. Although the addition amount of organometallic compound does not exert any significant influence on the molecular weight of obtained polymer, the reaction does not advance when the organometallic compound is not used. Further, when the addition amount of the thiol is increased, the polymerization velocity becomes higher. From these trends, it is assumed that, in the catalyst of the present invention, the organometallic compound exerts an activating catalytic function while the thiol exerts a polymerization initiating function (namely, functions as a polymerization initiating species) throughout the reaction. Thus, in the catalyst of the present invention, the addition amount of thiol is considered to exert a large influence on the molecular weight and the conversion.

Therefore, although the addition amount of thiols can appropriately be determined taking into account the molecular weight of polymer intended to obtain, the polymerization velocity, etc., the organometallic compound and the thiol are generally used in a molar ratio of 100:1 to 1:50,000, preferably 10:1 to 1:10,000, for realizing a smooth reaction advance without runaway of reaction.

The whole amount of thiol can be added to the reaction system at the initiation of the reaction. Also, the thiol can be added in such a manner that part of the thiol is added at the initiation of the reaction, the reaction is conducted for a desirable period of time and thereafter the rest of thiol is further added optionally together with a polymerizable unsaturated compound. The conversion is increased by the above further addition of thiol, or thiol together with a polymerizable unsaturated compound.

In the bulk polymerization catalyst of the present invention, disulfide, trisulfide and tetrasulfide compounds can be used in addition to the above organometallic compound and thiol as a polymerization initiating catalyst for the purpose of regulating the polymerization velocity and polymerization degree.

Examples of the disulfide, trisulfide and tetrasulfide compounds as a polymerization regulator usable in the present invention include diethyl trisulfide, dibutyl tetrasulfide, diphenyl disulfide, bis(2-hydroxyethyl) disulfide, bis(4-hydroxybutyl) tetrasulfide, bis(3-hydroxypropyl) trisulfide, bis(3-carboxypropyl) trisulfide, bis(3-carboxypropyl) tetrasulfide, bis(3-propyltrimethoxysilane) disulfide and bis (3-propyltriethoxysilane) trisulfide. These sulfide compounds can be used either individually or in combination. These sulfide compounds can be used in such an amount that the polymerization catalyst is not deactivated in the bulk polymerization of the present invention. For example, the sulfide compounds are generally used in an amount of 50 to 0 part by weight, preferably 20 to 0.005 part by weight, per 100 parts by weight of polymerizable unsaturated compound to be polymerized.

The bulk polymerization of a polymerizable unsaturated compound can be carried out with the use of the bulk polymerization catalyst comprising the organometal and the thiol according to the present invention.

For example, polymerizable unsaturated compounds represented by the following formulae (B), (B-1) and (B-2) are preferably used as the polymerizable unsaturated compound subjected to the bulk polymerization using the catalyst of the present invention.

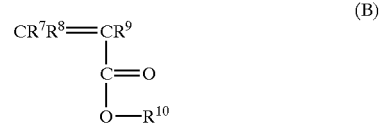

(B)

In the formula (B), each of $R^7$ to $R^9$ independently represents a hydrogen atom, a halogen atom or an alkyl group having 1 to 3 carbon atoms. $R^{10}$ represents a hydrogen atom, an alkali metal atom or a hydrocarbon group having 1 to 22 carbon atoms (the hydrocarbon group may be linear or may have side chains; the hydrogen atoms of the hydrocarbon group or group constituting the side chains may partially be substituted with at least one polar group, halogen atom or reactive functional group selected from the group consisting of —OH, —F, —COOH, —Cl, —NH$_2$, —Si (OH$_3$)$_3$, —Si(OCH$_3$)$_2$(CH$_3$) and —Si(CH$_3$)$_2$(OCH$_3$); and the hydrocarbon group may have a double bond or may have a cyclic structure). Specifically, $R^{10}$ can be, for example, an alkyl group, a cycloalkyl group, an aryl group, an alkenyl group, a cycloalkenyl group, an alkoxy group or an alkyl ether group. The hydrogen atoms of the group $R^{10}$ may partially be substituted with a halogen atom, a sulfonic acid residue, a glycidyl group or the like.

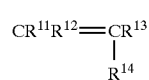
(B-1)

In the formula (B-1), $R^{11}$ to $R^{13}$ have the same meaning as the above $R^7$ to $R^9$. $R^{14}$ represents any of hydroxyl, —CO—NH$_2$, —CN, glycidyl, alkyl, alkoxy, alkenyl, cycloalkenyl, aryl, allyl ether, alkyl ether, alkoxysilyl, silanol and halogenated silyl groups. The hydrogen atoms of the group $R^{14}$ may at least partially be substituted with a halogen atom, etc. Moreover, the group $R^{14}$ may be a group which contains a structural unit derived from an alkylene glycol, an alkoxysilyl group, an alkylalkoxysilyl group, a methylol group or an alkoxyamido group.

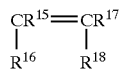
(B-2)

In the formula (B-2), $R^{15}$ and $R^{17}$ have the same meaning as the above $R^7$ to $R^9$. Each of $R^{16}$ and $R^{18}$ independently represents any of carboxyl, hydroxyl, —CO—NH$_2$, —CN, glycidyl, alkyl, alkoxy, alkenyl, cycloalkenyl and aryl groups. The hydrogen atoms of the groups $R^{16}$ and $R^{18}$ may at least partially be substituted with a halogen atom, etc. Moreover, these groups $R^{16}$ and $R^{18}$ may cooperate with two carbon atoms bonded with groups $R^{15}$ and $R^{17}$ to form a cyclic structure. The cyclic structure may have a double bond.

Furthermore, particular examples of these polymerizable unsaturated compounds include:

acrylic acid and salts thereof such as alkali metal acrylates;

methacrylic acid and salts thereof such as alkali metal methacrylates;

alkyl esters of acrylic acid such as methyl acrylate, ethyl acrylate, propyl acrylate, butyl acrylate, pentyl acrylate, hexyl acrylate, 2-ethylhexyl acrylate, octyl acrylate, nonyl acrylate, decyl acrylate and dodecyl acrylate;

aryl esters of acrylic acid such as phenyl acrylate and benzyl acrylate;

alkoxyalkyl acrylates such as methoxyethyl acrylate, ethoxyethyl acrylate, propoxyethyl acrylate, butoxyethyl acrylate and ethoxypropyl acrylate;

alkyl esters of methacrylic acid such as methyl methacrylate, ethyl methacrylate, propyl methacrylate, butyl methacrylate, pentyl methacrylate, hexyl methacrylate, 2-ethylhexyl methacrylate, octyl methacrylate, nonyl methacrylate, decyl methacrylate and dodecyl methacrylate;

aryl esters of methacrylic acid such as phenyl methacrylate and benzyl methacrylate;

alkoxyalkyl methacrylates such as methoxyethyl methacrylate, ethoxyethyl methacrylate, propoxyethyl methacrylate, butoxyethyl methacrylate and ethoxypropyl methacrylate;

(poly)alkylene glycol diacrylates such as ethylene glycol diacrylate, diethylene glycol diacrylate, triethylene glycol diacrylate, polyethylene glycol diacrylate, propylene glycol diacrylate, dipropylene glycol diacrylate and tripropylene glycol diacrylate;

(poly)alkylene glycol dimethacrylates such as ethylene glycol dimethacrylate, diethylene glycol dimethacrylate, triethylene glycol dimethacrylate, polyethylene glycol dimethacrylate, propylene glycol dimethacrylate, dipropylene glycol dimethacrylate and tripropylene glycol dimethacrylate;

polyacrylates such as trimethylolpropane triacrylate;

polymethacrylates such as trimethylolpropane trimethacrylate;

acrylonitrile, methacrylonitrile and vinyl acetate;

vinyl halide compounds such as vinylidene chloride, 2-chloroethyl acrylate and 2-chloroethyl methacrylate;

acrylic acid esters of alicyclic alcohol such as cyclohexyl acrylate;

methacrylic acid esters of alicyclic alcohol such as cyclohexyl methacrylate;

polymerizable compounds containing an oxazoline group such as 2-vinyl-2-oxazoline, 2-vinyl-5-methyl-2-oxazoline and 2-isopropenyl-2-oxazoline;

polymerizable compounds containing an aziridine group such as acryloylaziridine, methacryloylaziridine, 2-aziridinylethyl acrylate and 2-aziridinylethyl methacrylate;

vinyl monomers containing an epoxy group such as allyl glycidyl ether, glycidyl ether acrylate, glycidyl ether methacrylate, 2-ethylglycidyl ether acrylate and 2-ethylglycidyl ether methacrylate;

vinyl compounds containing a hydroxyl group such as 2-hydroxyethyl acrylate, 2-hydroxyethyl methacrylate, 2-hydroxypropyl acrylate, monoesters of acrylic acid or methacrylic acid and polypropylene glycol or polyethylene glycol and adducts of lactons and 2-hydroxyethyl (meth) acrylate;

fluorinated vinyl monomers such as fluorinated alkyl methacrylates and fluorinated alkyl acrylates;

unsaturated carboxylic acids other than (meth)acrylic acid such as itaconic acid, crotonic acid, maleic acid and fumaric acid, and salts, (partial) ester compounds and anhydrides of such unsaturated carboxylic acids;

vinyl monomers containing a reactive halogen such as 2-chloroethyl vinyl ether and vinyl monochloroacetate;

vinyl monomers containing an amido group such as methacrylamide, N-methylolmethacrylamide, N-methoxyethylmethacrylamide and N-butoxymethacrylamide;

vinyl compound monomers containing an organosilicon group such as vinyltrimethoxysilane, γ-methacryloxypropyltrimethoxysilane, allyltrimethoxysilane, trimethoxysilylpropylallylamine and 2-methoxyethoxytrimethoxysilane; and diene compounds such as ethylidenenorbornene, isoprene, pentadiene, vinylcyclohexene, chloroprene, butadiene, methylbutadiene, cyclobutadiene and methylbutadiene.

Moreover, macromonomers (e.g., fluoromonomers, silicon containing monomers, macromonomers, styrene, silicone, etc.) having a radical polymerizable vinyl group at an end of vinyl-polymerized monomer can be mentioned as further examples of the polymerizable unsaturated compounds.

These polymerizable unsaturated compounds can be used either individually or in combination. Although these polymerizable unsaturated compounds may be liquid, or solid, or gaseous, it is preferred from the easiness of operation that a liquid monomer be used at the reaction depending on reaction conditions.

Stable bulk polymerization of these polymerizable unsaturated compounds can be accomplished by the use of the catalyst for bulk polymerization according to the present invention comprising the organometallic compound of the formula [I] and the thiol.

The term of "bulk polymerization" used herein means a reaction in which a polymerizable unsaturated compound is polymerized substantially in the absence of any solvent. Thus, generally, the reaction system of bulk polymerization does not contain any reaction solvent. The expression "substantially in the absence of any solvent" means that any reaction solvent is not used and should not be construed as excluding an extremely small amount of solvent for dissolution or for dispersion employed to homogeneously disperse the catalyst for the bulk polymerization according to the present invention comprising the organometallic compound of the formula (I) and the thiol in the entirety of monomer, solvents remaining in raw materials, etc.

This bulk polymerization reaction is generally carried out in an atmosphere of inert gas. Thus, active gases such as oxygen are not present in the reaction system of bulk polymerization. Nitrogen, argon, helium and carbon dioxide gases can be mentioned as the inert gas for use in bulk polymerization.

Although the bulk polymerization catalyst of the present invention comprising the organometallic compound of the formula (I) and the thiol can be used in a regularly employed catalyst amount in this bulk polymerization, the organometallic compound of the formula (I) is generally added in an amount of 0.0000001 to 0.0001 mol per mol of unsaturated group of the polymerizable unsaturated compound, and preferably in such an amount that the molar ratio of organometallic compound to thiol is in the range of 10:1 to 1:10,000 in accordance with the molar amount of added thiol. The thiol is generally used in an amount of 0.00001 to 0.7 mol, preferably 0.0001 to 0.5 mol.

Although the bulk polymerization reaction using the catalyst of the present invention can be performed in heated or warm atmosphere or while cooling the reaction system, depending on the type of polymerizable unsaturated compound, it is preferred that the reaction temperature for bulk polymerization be set at 0 to 150° C., especially 25 to 120° C. The bulk polymerization reaction can be stably advanced without runaway by setting the reaction temperature for bulk polymerization so as to fall within the above range. Even if an acrylic-ester-type polymerizable unsaturated compound of relatively high polymerizability is employed, although depending on the activity of the unsaturated group of the employed polymerizable unsaturated compound, setting the reaction temperature at 0° C. or below causes lowering of the catalytic activities of the organometallic compound of the formula (I) and thiol and therefore the time required for attaining a satisfactory conversion is prolonged and not efficient. Further, even if a compound of low polymerization activity such as a styrene-type unsaturated compound is employed, a satisfactory polymerization rate can be attained by setting the reaction temperature at 25° C. or higher.

Setting the reaction temperature at 150° C. or higher may invite the danger of runaway of reaction attributed to extreme heat generation during the polymerization reaction. The smooth advance of reaction can be maintained without runaway of reaction by setting the polymerization temperature at 120° C. or below.

Although the reaction time can be appropriately set taking into account the conversion, molecular weight, etc. in the bulk polymerization of the present invention, it is generally preferred, for example, under the above conditions, that the reaction time be set at 2 to 12 hr, especially 2 to 8 hr.

This bulk polymerization reaction can be terminated by lowering the temperature of the reaction mixture or preferably by adding a polymerization inhibitor such as benzoquinone.

Polymers of a polymerization rate of generally at least 40%, preferably at least 60%, can be obtained by performing the bulk polymerization in the above described manner. Unreacted monomers, residual thiol and other low-boiling-point compounds remaining in the reaction system can be removed with the use of, for example, an evaporator in vacuum. The heating residue at 150° C. of the thus obtained polymer is generally at least 90%, preferably at least 95%.

With respect to the thus obtained polymer, the weight average molecular weight (Mw) measured by gel permeation chromatography (GPC) is generally in the range of 500 to 1,000,000, preferably 1000 to 300,000, while the number average molecular weight (Mn) is generally in the range of 500 to 1,000,000, preferably 1000 to 100,000. The dispersion index thereof (Mw/Mn) is generally in the range of 1.02 to 9.0, preferably 1.2 to 3.0.

The thus obtained polymer is mostly a generally viscous liquid. The viscosity measured at 23° C. is generally in the range of 100 to 1,000,000 centipoises (cps), preferably 1000 to 100,000 centipoises (cps).

Unless a deliming treatment which removes the deactivated catalyst from the obtained polymer is conducted, the organometallic compound is mixed in the polymer obtained by polymerization with the use of the catalyst for bulk polymerization according to the present invention. Further, sulfurous or sulfuric groups derived from the added thiol are bonded to at least a part of molecular terminals of the obtained polymer. In this connection, although the compound having a thiol group is used as a polymerization initiating species in the bulk polymerization with the catalyst according to the present invention, commonly such a thiol compound alone exhibits no activity as polymerization initiating species. When an organometallic compound is used in accordance with the present invention, however, a thiol group derivable from the thiol compound is converted to an active species capable of initiating polymerization by the organometallic catalyst to thereby become an initiating species for the monomer. Therefore, in this reaction, the conversion per time is enhanced by an increase of the amount of thiol relative to the amount of monomer. Accordingly, sulfurous or sulfuric groups derived from the added thiol are bonded to polymerization initiation terminals of the obtained polymer. However, the added thiol functions not only as a polymerization initiating species but also as a chain transfer agent, so that the molecular weight (degree of polymerization) and conversion of monomer are greatly influenced by the amount of thiol. It can be presumed from these phenomena that the advance and termination of polymerization in this reaction are those of radical polymerization. The thio-radical (•S) of the thiol having undergone a hydrogen abstraction by the chain transfer once more attacks the monomer as a polymerization initiating species. Therefore, sulfurous or sulfuric groups derived from the added thiol are bonded to terminals of the polymer produced by this polymerization method, irrespective of the addition amount of thiol.

With respect to the reaction system of the present invention, the same reaction as in the above bulk polymerization can be effected in a polar organic solvent such as an alcohol or a dispersion medium such as water. Therefore, it is conceivable that a radical reaction is predominant in the polymerization of the present invention. Accordingly, it can be presumed that the reaction termination ends of obtained polymer consist of hydrogen attributed to the chain transfer from the thiol, or the thiol having thio-radicals due to the conversion to radical, and sulfurous or sulfuric groups derived from the thiol by radical coupling with growing polymer radicals.

In the obtained polymer, the organometallic compound remains in its original form (that is, the organometallic compound), or in the form of being bonded with another organic group, or in the form of a metal. The thiol directly contributes to the polymer forming reaction and the reaction is advanced while the thiol itself is being decomposed, so that terminal groups derived from the thiol are introduced in the polymer ends.

The above presumption and advance of reaction are believed to be the most rational by the inventor on the basis of various phenomena experienced in the reaction of the present invention, which naturally in no way limit the scope of the present invention.

The polymer obtained by the method of the present invention is generally a viscous liquid, which is however cured by reaction in the presence of compounded curing agent or the like. The resultant curing product has elasticity.

The polymer obtained by the method of the present invention can be applied to uses in which the curability thereof is utilized, uses in which the elasticity of the cured product is utilized, uses in which the polymer being a viscous liquid is utilized and other uses. For example, the polymer obtained by the method of the present invention can be used in coating materials (paint), sealing materials, coating film waterproofers, pressure sensitive adhesives, adhesives, sheeted items (gas permeable sheets, protective sheets, water barrier sheets, damping sheets, transfer sheets, light controlling sheets, antistatic sheets, conductive sheets, curing sheets, noise insulating sheets, shade sheets, decorative sheets, marking sheets and flame retardant sheets) and raw materials thereof, film moldings (marking films, protective films, ink fixing films and laminate films) and raw materials thereof, foams (hard, soft, semirigid and flame retardant) and raw materials thereof, ink vehicles, reactive plasticizers, plasticizers, diluents, compatibilizers, intermediate materials for resins such as polyester resins, polyurethane resins, polycarbonate resins and various block polymers, reforming materials, additives, fiber modifiers, fiber surface treatments, paper processing agents, paper modifiers, surfactants, dispersion stabilizers, dispersion mediums, solvents, viscosity regulators, adsorbents, hair treatments, toner additives, electrification controlling agents, antistatic agents, low-shrinkage agents, antifogging agents, stainproofing agents, hydrophilicity imparting agents, lipophilicity imparting agents, medicine carriers, carriers for agricultural chemicals, cosmetic compounding agents, lubricants, polymer alloy additives, gel coating agents, FRP resins, FRP resin additives, resins for artificial marble, resin additives for artificial marble, casting resins, raw materials for UV/EV cured resins, tackifiers, various binders (magnetic recording medium, for molding, for burned products and glass fiber sizing material), RIM urethane modifiers, resins for glass laminate, damping materials, noise insulating materials, resins for separating membranes, soundproofing materials, sound absorbing materials, artificial leathers, artificial skins, synthetic leathers, various industrial parts, daily needs, molded items for toiletry, acrylic urethane rubbers, acrylic urethane rubber modifiers, acrylic urethane foam modifiers, urethane rubber modifiers, urethane foam plasticizers, urethane foam modifiers and acrylic rubber modifiers.

EFFECT OF THE INVENTION

The use of the catalyst of the present invention enables performing a stable bulk polymerization, without runaway of reaction, even if polymerizable unsaturated compounds such as acrylic monomers have experienced relative difficulty in controlling the polymerization reaction.

Further, the properties of obtained polymer and polymerization condition therefor, such as polymerization rate, molecular weight and polymerization velocity, can be controlled mainly by regulating the addition amount of thiol with the use of the catalyst of the present invention.

Moreover, groups derived from the thiol are introduced in molecular terminals of the polymer produced with the use of the catalyst of the present invention, so that the employed thiol compound can securely be introduced in at least one end of each polymer molecule. When the employed thiol has a functional group other than the thiol group, the functional group can be introduced in at least one end of each obtained polymer molecule. A curing reaction and various other reactions can be performed by utilizing the introduced functional group.

EXAMPLES

The present invention will further be illustrated below with reference to the following Examples which in no way limit the scope of the invention.

Example 1

100 parts by weight of ethyl acrylate and 0.05 part by weight of ruthenocene as a metal catalyst were charged into a flask equipped with an agitator, a nitrogen gas introduction tube, a thermometer and a reflux cooling tube. The flask contents were heated to 70° C. while introducing nitrogen gas into the flask.

Subsequently, 6 parts by weight of β-mercaptopropionic acid satisfactorily purged with nitrogen gas was added to the flask contents under agitation. Cooling and heating were performed for two hours after the addition of the β-mercaptopropionic acid so that the temperature of the flask contents under agitation was maintained at 70° C. Further, another 6 parts by weight of β-mercaptopropionic acid satisfactorily purged with nitrogen gas was added to the flask contents under agitation. Reaction was carried out for four hours after the further addition of the β-mercaptopropionic acid with further cooling and heating so that the temperature of the flask contents under agitation was maintained at 70° C.

After the above reaction performed for 6 hr in total, the reaction product was cooled to room temperature. Then, 20 parts by weight of a benzoquinone solution (95% THE solution) was added to the reaction product to thereby terminate polymerization.

With respect to the thus obtained THF solution of reaction product, the ratio of monomer residue was measured by gas chromatography, thereby determining the polymerization rate thereof.

As a result, it was found that a reaction product whose conversion was 78% was obtained. No runaway of polymerization reaction was observed at all during the polymerization.

Thereafter, the obtained reaction product was transferred into an evaporator and slowly heated up to 80° C. in vacuum to thereby remove THF, monomer residue and thiol compound residue.

The 150° C. heating residue of the thus obtained polymer was 99.2%.

With respect to the obtained polymer, the molecular weight measured by gel permeation chromatography (GPC) was 4400 in terms of Mw and 2800 in terms of Mn. The dispersion index was 1.6, and the viscosity at 23° C. was 48,500 centipoises (cps).

Example 2

100 parts by weight of methyl acrylate, 10 parts by weight of trimethylolpropane triacrylate and 0.02 part by weight of zirconocene dichloride as a metal catalyst were charged into a flask equipped with an agitator, a nitrogen gas introduction tube, a thermometer and a reflux cooling tube. The flask contents were gently heated to 80° C. while introducing nitrogen gas into the flask.

Subsequently, 50 parts by weight of 3-mercaptopropyl (trimethoxy)silane satisfactorily purged with nitrogen gas was added to the flask contents under agitation. Reaction was carried out for eight hours after the addition of the 3-mercaptopropyl(trimethoxy)silane while cooling and heating so that the temperature of the flask contents under agitation was maintained at 80° C.

After the above reaction, the reaction product was cooled to room temperature. Then, 20 parts by weight of a benzoquinone solution (95% THF solution) was added to the reaction product to thereby terminate polymerization.

With respect to the thus obtained THF solution of reaction product, the ratio of monomer residue was measured by gas chromatography, thereby determining the polymerization rate thereof.

As a result, it was found that the conversion was 82%. No runaway of polymerization reaction was observed at all during the above polymerization.

Thereafter, the obtained reaction product was transferred into an evaporator and slowly heated up to 80° C. in vacuum to thereby remove THF, monomer residue and thiol compound residue.

The 150° C heating residue of the thus obtained polymer was 98.7%.

With respect to the obtained polymer, the molecular weight measured by gel permeation chromatography (GPC) was 1400 in terms of Mw and 800 in terms of Mn. The dispersion index was 1.8, and the viscosity at 23° C. was 1300 centipoises (cps).

Example 3

80 parts by weight of styrene, 20 parts by weight of perfluorooctylethylene and 0.1 part by weight of titanocene dichloride as a metal catalyst were charged into a flask equipped with an agitator, a nitrogen gas introduction tube, a thermometer and a reflux cooling tube. The flask contents were heated to 80° C. while introducing nitrogen gas into the flask.

Subsequently, 10 parts by weight of 2-mercaptoethanol satisfactorily purged with nitrogen gas was added to the flask contents under agitation. Reaction was carried out for two hours after the addition of the 2-mercaptoethanol while cooling and heating so that the temperature of the flask contents under agitation was maintained at 80° C.

Thereafter, 10 parts by weight of 2-mercaptoethanol was added to the flask contents under agitation, and further reaction was performed for two hours. Moreover, 20 parts by weight of 2-mercaptoethanol was added to the flask contents under agitation, and still further reaction was performed for four hours.

Upon the passage of 8 hr in total, the reaction product was cooled to room temperature. Then, 20 parts by weight of a benzoquinone solution (95% THF solution) was added to the reaction product to thereby terminate polymerization.

With respect to the thus obtained THF solution of reaction product, the ratio of monomer residue was measured by gas chromatography, thereby determining the polymerization rate thereof.

As a result, it was found that the conversion was 68%. No runaway of polymerization reaction was observed at all during the above polymerization.

Comparative Example 1

Reaction was performed in the same manner as in Example 1, except that the metal catalyst ruthenocene was not added. With respect to the thus obtained polymer, the conversion was 9%.

Comparative Example 2

Reaction was performed in the same manner as in Example 1, except that the thiol compound β-mercaptopropionic acid was not added. With respect to the thus obtained polymer, the conversion was 1%.

What is claimed is:
1. A catalyst for bulk polymerization comprising an organametallic compound and a thiol, said thiol being selected from the group consisting of:
alkylthiols having no functional group other than a thiol group;
aromatic thiols having no functional group other than a thiol group;
thiols having a functional group other than a thiol group selected from the group consisting of β-mercaptopropionic acid, mercaptoethanol, 3-mercaptopropyl (trimethoxy) silane and thiophenol;
polyfunctional thiol compounds obtained by esterifying trithioglycerol or pentaerythritol with β-mercaptopropionic acid, and
polmeric thiols having an active thiol group, said organometallic compound represented by the formula:

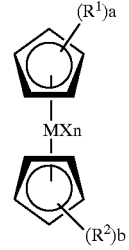

wherein M represents a metal selected from the group consisting of metals of Groups 4A, 4B, 5A and 5B of the periodic table, chromium, ruthenium and palladium; each of $R^1$ and $R^2$ independently represents at least one group selected from the group consisting of an unsubstituted or substituted aliphatic hydrocarbon group, an unsubstituted or substituted alicyclic hydrocarbon group, an unsubstituted or substituted aromatic hydrocarbon group and an unsubstituted or substituted silicon containing group, a hydrogen atom or a single bond, provided that $R^1$ and $R^2$ may cooperate with each other to bond the two 5-membered rings shown in the formula and provided that neighboring groups of $R^1$ or $R^2$ may cooperate with each other to form a cyclic structure;

each of a and b independently is an integer of 1 to 4; X represents a halogen atom or a hydrocarbon group optionally having at least one of hydrogen atoms thereof substituted with a halogen atom; and n is 0 or an integer subtractizig 2 from the valence of metal M.

2. The bulk polymerization catalyst as claimed in claim 1, wherein the organometallic compound represented by the formula (I) and the thiol are used in a molar ratio of 10:1 to 1:10,000.

* * * * *

UNITED STATES PATENT AND TRADEMARK OFFICE
CERTIFICATE OF CORRECTION

PATENT NO. : 6,861,486 B2
DATED : March 1, 2005
INVENTOR(S) : Okamoto et al.

It is certified that error appears in the above-identified patent and that said Letters Patent is hereby corrected as shown below:

Column 14,
Line 47, "polmeric thiols" should read -- polymeric thiols --.

Column 16,
Line 3, "an integer subtractizig" should read -- an integer substracting --.

Signed and Sealed this

Eighteenth Day of October, 2005

JON W. DUDAS
*Director of the United States Patent and Trademark Office*